United States Patent
Pan

(10) Patent No.: US 12,507,714 B2
(45) Date of Patent: Dec. 30, 2025

(54) METHODS AND COMPOSITIONS FOR INCREASING KETONE BODIES IN ANIMALS

(71) Applicant: Société des Produits Nestlé S.A., Vevey (CH)

(72) Inventor: Yuanlong Pan, Chesterfield, MO (US)

(73) Assignee: Société des Produits Nestlé S.A., Vevey (CH)

(*) Notice: Subject to any disclaimer, the term of this patent is extended or adjusted under 35 U.S.C. 154(b) by 1071 days.

(21) Appl. No.: 16/430,907

(22) Filed: Jun. 4, 2019

(65) Prior Publication Data

US 2019/0373917 A1  Dec. 12, 2019

Related U.S. Application Data

(60) Provisional application No. 62/681,873, filed on Jun. 7, 2018.

(51) Int. Cl.
*A23K 20/158* (2016.01)
*A23K 20/147* (2016.01)
*A23K 20/163* (2016.01)
*A23K 50/42* (2016.01)

(52) U.S. Cl.
CPC .......... *A23K 20/158* (2016.05); *A23K 20/147* (2016.05); *A23K 20/163* (2016.05); *A23K 50/42* (2016.05)

(58) Field of Classification Search
CPC ....... A23L 33/30; A23L 33/12; A23K 20/147; A23K 20/158; A23K 20/163; A23K 50/42; A23K 50/40; A23V 2250/1878; A23V 2002/00
See application file for complete search history.

(56) References Cited

U.S. PATENT DOCUMENTS

| | | | | |
|---|---|---|---|---|
| 5,258,197 A * | 11/1993 | Wheeler | ................. | A23G 3/343 426/660 |
| 6,410,063 B1 * | 6/2002 | Jewell | ...................... | A61P 43/00 426/805 |
| 6,468,962 B1 | 10/2002 | Portman | | |
| 6,716,815 B2 | 4/2004 | Portman | | |
| 8,242,180 B2 | 8/2012 | Roberts | | |
| 8,835,490 B2 | 9/2014 | Pan | | |
| 2005/0100584 A1 * | 5/2005 | Miller | ................... | A23K 20/158 424/442 |
| 2005/0233045 A1 | 10/2005 | Aldred et al. | | |
| 2006/0040003 A1 | 2/2006 | Needleman et al. | | |
| 2007/0116788 A1 | 5/2007 | Murase et al. | | |
| 2007/0135376 A1 * | 6/2007 | Henderson | .............. | A61K 31/22 514/52 |
| 2011/0081443 A1 | 4/2011 | Schoenherr et al. | | |
| 2014/0227373 A1 * | 8/2014 | Longo | ..................... | A23L 33/17 514/274 |
| 2014/0274920 A1 * | 9/2014 | Davenport | ............. | A61K 36/60 514/23 |
| 2014/0350105 A1 * | 11/2014 | D'Agostino | .............. | A23L 2/52 514/547 |
| 2016/0143324 A1 * | 5/2016 | Pan | ....................... | A23K 20/163 426/2 |
| 2018/0279661 A1 * | 10/2018 | Sommerfeld | ........... | A23L 33/30 |

FOREIGN PATENT DOCUMENTS

| | | | | |
|---|---|---|---|---|
| CN | 1092934 A | * | 10/1994 | ............. A23K 1/164 |
| EP | 2053931 B1 | | 2/2012 | |
| JP | 2009524587 A | | 7/2009 | |
| SU | 1161066 A1 | | 6/1985 | |
| WO | 2005020717 A1 | | 3/2005 | |
| WO | 2006052135 A2 | | 5/2006 | |
| WO | 2006061087 A1 | | 6/2006 | |
| WO | 2007115899 A1 | | 10/2007 | |
| WO | 2009053487 A2 | | 4/2009 | |
| WO | 2009132931 A1 | | 11/2009 | |
| WO | 2010048114 A1 | | 4/2010 | |
| WO | 2011051899 A1 | | 5/2011 | |
| WO | 2011134802 A1 | | 11/2011 | |
| WO | 2013057229 A1 | | 4/2013 | |
| WO | 2015041977 A1 | | 3/2015 | |
| WO | 2017199223 A1 | | 11/2017 | |

OTHER PUBLICATIONS

Parrish (The Use of Medium-Chain Triglycerides in Gastrointestinal Disorders, 2017, https://med.virginia.edu/ginutrition/wp-content/uploads/sites/199/2014/06/Parrish-February-17.pdf) (Year: 2017).*
Leite, Joao Costa, et al., "Comparison of the effect of multicomponent and resistance training et al." Archives of Gerontology and Geriatrics, 2015 pp. 412-417, vol. 60.
Wolfram, Swen, "Effects of Green Tea and EGCG on Cardiovascular and Metabolic Health", Journal of the American College of Nutrition, 2007, pp. 373S-388S, vol. 26, USA.
Lattimer, et al., "Effects of Dietary Fiber and Its Components on Metabolic Health," Nutrients, 2010, pp. 1266-1289, vol. 2, USA.
Rueda, Ricardo, "The role of Complex Lipids in Attaining Metabolic Health", Curr Cardiovasc Risk Rep., 2014, 8:371, 8 pages.
Coates, Alison M. et al., "Edible nuts and metabolic health" Curr Opin Lipidol 2007 18:25-30.
Goodpaster, Bret H., et al. "Enhanced Fat Oxidation Through Physical Activity, et al." Diabetes Sep. 2003, vol. 52 pp. 2191-2197, USA.

(Continued)

*Primary Examiner* — Emily M Le
*Assistant Examiner* — Carrie Glimm

(57) ABSTRACT

A method of increasing ketone bodies in an animal can comprise orally administering a composition to the animal, where the composition comprises medium-chain triglycerides in an amount of about 1% to about 15%, protein in amount of about 30% to 70%, fat in an amount of about 20% to about 40%, and carbohydrates in an amount of about 10% to about 25%. The composition can have a protein to carbohydrate ratio of at least about 2:1.

20 Claims, No Drawings

(56) References Cited

OTHER PUBLICATIONS

Hodgson, Adrian B., et al., "The Effect of Green Tea Extract on Fat Oxidation, et al." American Society for Nutrition Adv. Nutr. 2013 pp. 129-140 vol. 4.

Inoue, Naohiko et al.,, "Enhanced Energy Expenditure and Fat Oxidation in Humans et al." Biosci. Biotechnol. Biochem, 2007 pp. 380-389 vol. 71(2).

Westman, Eric C. et al, "Low-carbohydrate nutrition and metabolism" Am J Clin Nutr 2007 pp. 276-284, vol. 86 USA.

Romsos, Dale R., et al., "Effects of Dietary Carbohydrate, Fat and Protein on Growth, Body Composition and Blood Metabolite Levels in the Dog," Department of Food Science and Human Nutrition and Animal Husbandry, Michigan state University 1976 XP-001053400 pp. 1452-1464 USA.

Li, Qinghong et al., "Effects of Dietary Protein and Carbohydrate Ratio on Gut Microbiomes in Dogs of Different Body Conditions" American Society for Microbiology 2016 vol. 8 Issue 1 pp. 1703-1716 USA.

Matulka, Ray A., et al., "Lack of toxicity by medium chain triglycerides (MCT) in canines during a 90-day feeding trial" Food and Chemical Toxicology 2009 pp. 35-39 vol. 47 USA.

International Search Report, Written Opinion and Transmittal Sep. 26, 2019, PCT/IB2019/04638.

Gentile, Christopher L., et al., "Resistant starch and protein intake enhances fat oxidation and feelings of fullness in lean and overweight/obese women," Nutrition Journal 2015 14:113 10 pages USA.

"Coconut Flavoured Protein Bar", Mintel, Record Id 4001227, 2016, pp. 1-3.

Russian Office Action for Russian Appl No. 2020142384/10 dated Sep. 20, 2022.

* cited by examiner

METHODS AND COMPOSITIONS FOR INCREASING KETONE BODIES IN ANIMALS

CROSS REFERENCE TO RELATED APPLICATIONS

This application claims priority to U.S. Provisional Application Ser. No. 62/681,873 filed Jun. 7, 2018, the disclosure of which is incorporated in its entirety herein by this reference.

BACKGROUND

The present disclosure relates generally to methods and compositions containing medium-chain triglycerides to increase ketone bodies in an animal.

Medium-chain triglycerides ("MCT" or "MCTs") are lipid molecules that have been included for various purposes in food compositions for animals or humans. MCTs have been added to "wet" foods such as canned food and other prepared food and have been used to some extent in, or as coatings on, dry food. However, practical considerations appear to limit the amount of MCTs that can be used, particularly for dry foods. For example, while wet food compositions may incorporate a significant amount of MCTs, they may be subject to separation, flavor issues, and other problems. For dry foods, such as extruded and baked products, the compositions are strictly subject to limits wherein the MCTs cannot be increased above a certain threshold in many products. MCTs have thus been used as a coating or surface application for such foods. Surface application, such as coating, poses practical problems for packaging and reduces consumer appeal. For example, consumption or administration of such food compositions is far more cumbersome if a coating must be poured on or mixed in at the time of consumption or if the dry food has an oily appearance or feel. In addition, large quantities of MCTs not integrally incorporated into the food matrix can cause problems with palatability and tolerance of such food compositions.

Chemically, medium-chain triglycerides comprise a group of triglycerides having three medium-chain length (6-12 carbon) fatty acid molecules esterified to a glycerol molecule. Such compositions are different, both physically and chemically, from the majority of fats typically used in food technology for formulating food products. MCTs tend to be shorter and have different functional properties for processing than their longer-chain counterparts. For example, MCTs are typically liquid at room temperature, unlike many other functional fats used by food technologists.

Even considering the above challenges, MCT containing compositions continue to be desired based on claimed associated health benefits of MCTs including: alternate energy source for the brain, associated cognition benefits, accelerated metabolic conversion, weight loss, enhanced exercise performance, enhanced endurance, muscle strength, activity, etc.

Therefore, research and development regarding MCTs continue to be sought.

SUMMARY

The present disclosure relates to compositions comprising medium-chain triglycerides and methods comprising administering the compositions to an animal. More specifically, the present disclosure relates to compositions and methods for increasing ketone bodies in an animal.

Accordingly, a method of increasing ketone bodies in an animal can comprise orally administering a composition to the animal, where the composition comprises medium-chain triglycerides in an amount of about 1% to about 15%, protein in amount of about 30% to 70%, fat in an amount of about 20% to about 40%, and carbohydrates in an amount of about 10% to about 25%. Additionally, the composition can have a protein to carbohydrate ratio of at least about 2:1.

Further, in one embodiment, a composition for increasing ketone bodies in an animal, can comprise medium-chain triglycerides in an amount of about 1% to about 15%, protein in amount of about 30% to 70%, fat in an amount of about 20% to about 40%, and carbohydrates in an amount of about 10% to about 25%. Additionally, the composition can have a protein to carbohydrate ratio of at least about 2:1.

Additional features and advantages are described herein and will be apparent from, the following Detailed Description and the Figures.

DETAILED DESCRIPTION

Definitions

Some definitions are provided hereafter. Nevertheless, definitions may be located in the "Embodiments" section below, and the above header "Definitions" does not mean that such disclosures in the "Embodiments" section are not definitions.

As used in this disclosure and the appended claims, the singular forms "a," "an" and "the" include plural referents unless the context clearly dictates otherwise. Thus, for example, reference to "an ingredient" or "the ingredient" includes two or more ingredients. The term "and/or" used in the context of "X and/or Y" should be interpreted as "X," or "Y," or "X and Y." Where used herein, the term "example," particularly when followed by a listing of terms, is merely exemplary and illustrative, and should not be deemed to be exclusive or comprehensive.

As used herein, "about" is understood to refer to numbers in a range of numerals, for example the range of −10% to +10% of the referenced number, in one aspect, within −5% to +5% of the referenced number, in another aspect, within −1% to +1% of the referenced number, and in a specific aspect, within −0.1% to +0.1% of the referenced number. A range that is "between" two values includes those two values. Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

All percentages expressed herein are by weight of the total weight of the composition unless expressed otherwise. All percentages for food compositions are by dry matter basis unless expressed otherwise. All ratios expressed herein are by weight unless expressed otherwise. When reference is made to the pH, values correspond to pH measured at 25° C. with standard equipment.

The terms "food," "food product" and "food composition" mean a product or composition that is intended for ingestion by an animal, including a human, and provides at least one nutrient to the animal. Further in this regard, these terms mean that the product or composition is in a form ready for consumption and is not merely an intermediate from which a consumable product or composition is made, although other food compositions can be added in some embodiments. The term "pet food" means any food composition intended to be consumed by a pet. The term "pet" means any animal that could benefit from or enjoy the compositions provided by the present disclosure. For example, the pet can be an avian, bovine, canine, equine, feline, hircine, lupine, murine, ovine, or porcine animal, but the pet can be any suitable animal. In some embodiments, the pet can be a canine or feline.

The term "animal" refers to any animal including mammals such as humans and companion animals. In one embodiment, the term animal can refer to humans and companion animals. The term "companion animal" means a dog or a cat. As used herein, the term "dog" and "canine" can be used interchangeably. As used herein, the term "cat" and "feline" can be used interchangeably. In one embodiment, the companion animal can be a canine. In another embodiment, the companion animal can be a feline.

"Wet food" means a pet food having a moisture content from about 50% to about 90%, and in one aspect, from about 70% to about 90%. "Dry food" means a pet food having a moisture content less than about 20%, and in one aspect, less than about 15%, and in a specific aspect, less than about 10%. "Semi-moist food" means a pet food having a moisture content from about 20% to about 50%, and in one aspect, from about 25% to about 35%. "Kibbles" means pieces of dry or semi-moist pet food which can have a pellet shape or any other shape. Non-limiting examples of kibbles include particulates; pellets; pieces of pet food, dehydrated meat, meat analog, vegetables, and combinations thereof; and pet snacks, such as meat or vegetable jerky, rawhide, and biscuits.

The compositions disclosed herein may lack any element that is not specifically disclosed herein. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. Moreover, the description of some steps as "optional" does not imply that the other steps which are not explicitly described as optional are necessarily required.

Any embodiment disclosed herein can be combined with any other embodiment disclosed herein.

The relative terms "improved," "increased," "enhanced" and the like refer to the effects of the composition disclosed herein (a composition comprising an amount of medium-chain triglycerides, protein, and carbohydrates) relative to a composition having lower amounts of medium-chain triglycerides, protein, and/or carbohydrates, or lacking medium-chain triglycerides, protein, and/or carbohydrates, but otherwise identical.

A "medium-chain triglyceride" or "MCT" or "MCTs" is a lipid in which three fatty acids are bound by ester linkages to a glycerol backbone, and at least two and preferably all three of the fatty acids are each between six and twelve carbons in length. The medium-chain fatty acids are caproic acid (comprising six carbon atoms or C6:0 or C6), caprylic acid (comprising eight carbon atoms or C8:0 or C8), capric acid (comprising ten carbon atoms or C10:0 or C10) and lauric acid (comprising twelve carbon atoms or C12:0 or C12). In one embodiment, the medium-chain fatty acids are mainly (e.g., at least 98%) in the form of triglycerides. In another embodiment, the medium-chain fatty acids of the MCTs can be selected from the group consisting of caprylic acid, capric acid, and a mixture thereof, where such medium-chain fatty acids comprise about 80% to about 100% of the total medium-chain fatty acids present in the MCTs. Such an embodiment refers to the total amount of medium-chain fatty acids that are bound to the glycerol backbones in the MCTs as a percent of all medium-chain fatty acids bound to the glycerol backbones in the MCTs. In one embodiment, the medium chain fatty acids of the medium chain triglycerides can include at least 50% caprylic acid of the total medium chain fatty acids that are present. In another embodiment, the medium chain fatty acids of the medium chain triglycerides can include at least 90% caprylic acid of the total medium chain fatty acids that are present.

The term "maintenance energy requirement" or "MER" or "baseline maintenance energy requirement" means the minimum amount of a food composition that is needed to sustain the weight of an animal. In one embodiment, the MER can be determined over a period of 1 to 12 weeks using feeding trial; or indirect or direct calorimetry. Non-calorimetric methods can also be used.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

Embodiments

One embodiment of the present disclosure is a method of increasing ketone bodies in an animal comprising orally administering a composition to the animal, wherein the composition comprises medium-chain triglycerides in an amount of about 1% to about 15%, protein in amount of about 30% to 70%, fat in an amount of about 20% to about 40%, and carbohydrates in an amount of about 10% to about 25%. Generally, the composition can have a protein to carbohydrate ratio of at least about 2:1.

Generally, the administration of the compositions described herein can provide an increase in ketone bodies in the animal. Such an increase in ketone bodies can determined by measuring postprandial beta-hydroxybutyrate (BHB) levels in the animal. The BHB can be measured at 2 hours postprandial, 4 hours postprandial, 6 hours postprandial, or even 8 hours postprandial. Additionally, an increase in ketone bodies can be determined by postprandial measuring acetoacetate or acetone in the blood of the animal including at the times discussed above.

Generally, the medium-chain triglycerides can be about 1% to about 15% of the composition. In one aspect, the medium-chain triglycerides can be from about 1% to about 10% of the composition. In other aspects, the medium-chain triglycerides can be from about 1% to about 5%, from about 5% to about 10%, or from about 2% to about 8% of the composition. The medium-chain triglycerides may be prepared by any known process, such as direct esterification, rearrangement, fractionation and/or transesterification. For example, the medium-chain triglycerides may be prepared from a source of vegetable oil, such as coconut oil, through a rearrangement process. The chain length and distribution thereof may vary depending on the source oil. For example, MCTs containing 1-10% C6, 30-60% C8, 30-60% C10 and 1-10% C12 can be derived from palm oil and/or coconut oil; in some embodiments, at least a portion of the MCTs can be provided by coconut oil, but in other embodiments the composition does not contain coconut oil. MCTs containing at least about 95% C8 can be made by semi-synthetic esterification of octanoic acid to glycerin; in some embodiments thereof, the remainder of the fatty acids can be C6 and C10. Mixtures comprising MCTs with about 50% total C8 and/or about 50% total C10 can also be used herein. In one embodiment, the medium-chain fatty acids of the MCTs can be selected from the group consisting of caprylic acid, capric acid, and a mixture thereof, where such medium-chain fatty acids comprise about 80% to about 100% of the total medium-chain fatty acids present in the MCTs. In one embodiment, the MCTs can substantially include fatty acids that are caprylic acid (C8). For example, such MCTs can include those having at least 50%, at least 55%, at least 60%, at least 65%, at least 70%, at least 75%, at least 80%, at least 85%, at least 95%, or even 100%, caprylic acid.

Generally, the composition can be administered on a regular basis to the animal. In one aspect, the regular basis can be at least weekly, or in one specific aspect, at least daily. In one embodiment, the composition can be administered on a long-term basis to the animal. In one aspect, the long-term basis can be at least for 6 months, and in one specific aspect, for at least 1 year. In some embodiments, the composition can be administered to the animal for a time period of at least one week, at least one month, at least two, three, four, five or six months; and in some embodiments, for at least one year. During the time period, the composition can be administered to the animal at least one day per week, at least two days per week, at least three, four, five or six days per week; or even seven days per week. The composition can be administered in a single dose per day or in multiple separate doses per day. In an embodiment, the composition can be administered in an amount that provides about 0.001 g to 50 g of the MCTs per kg body weight of the animal per day. In one aspect, 0.1 g to about 5 g of the MCTs per kg body weight of the animal can be administered per day.

As noted herein, the present disclosure provides a composition for increasing ketone bodies in an animal, comprising medium-chain triglycerides in an amount of about 1% to about 15%, protein in amount of about 30% to 70%, fat in an amount of about 20% to about 40%, and carbohydrates in an amount of about 10% to about 25%. Generally, the composition can have a protein to carbohydrate ration of at least about 2:1. In one aspect, the ratio can range from about 2:1 to about 20:1. In other aspects, the ratio can range from about 3:1 to about 10:1, about 3:1 to about 8:1, about 3:1 to about 6:1, or even about 3:1 to about 5:1. As discussed herein, the term "about" can modify each end point by ±10%, ±5%, ±1%, or even ±0.1%. For example, the protein to carbohydrate ratio can range from 2.7:1 to 22:1, 2.7:1 to 18:1, 2.7:1 to 10.1:1, 2.85:1 to 9.9:1, 2.7:0.9 to 5.4:1.1, etc.

Generally, the present compositions can be any type of food compositions suitable for oral ingestions by an animal. In one embodiment, the composition can be a food composition formulated for human consumption. Such food compositions can be any type of composition such as liquids, shakes, solid food, main meal, treats, snacks, supplements, etc. In one embodiment, the composition can be a pet food composition. In one aspect, the composition can be a complete and nutritionally balanced pet food. The present compositions are intended for use for any animal. In one aspect, the animal can be a human. In another aspect, the animal can be a companion animal. In yet other aspects, the animal can be a canine or the animal can be a feline.

Additionally, the present compositions can include omeg-3 fatty acids. Non-limiting examples of suitable omega-3 fatty acids include eicosapentaenoic acid (EPA), docosahexaenoic acid (DHA), alpha-linolenic acid (ALA) and mixtures thereof. In one embodiment, the omega-3 fatty acids can range from about 0.2% to about 5% of the composition. In some embodiments, the omega-3 fatty acids are at least about 0.2%, at least about 1.0%, or at least about 2.0%.

Regarding the pet food compositions disclosed herein, such compositions can be any food formulated for consumption by a pet such as a dog or a cat. In an embodiment, the pet food composition provides complete nutrition as defined by the Association of American Feed Control Officials (AAFCO) and which depends on the type of animal for which the composition is intended (e.g., a dog or cat).

The pet food composition can comprise meat, such as emulsified meat. Examples of suitable meat include poultry, beef, pork, lamb and fish, especially those types of meats suitable for pets. The meat can include any additional parts of an animal including offal. Some or all of the meat can be provided as one or more meat meals, namely meat that has been dried and ground to form substantially uniform-sized particles and as defined by AAFCO. Additionally or alternatively, vegetable protein can be used, such as pea protein, corn protein (e.g., ground corn or corn gluten), wheat protein (e.g., ground wheat or wheat gluten), soy protein (e.g., soybean meal, soy concentrate, or soy isolate), rice protein (e.g., ground rice or rice gluten) and the like.

The pet food compositions disclosed herein can comprise one or more of a vegetable oil, a flavorant, a colorant or water. Non-limiting examples of suitable vegetable oils include soybean oil, corn oil, cottonseed oil, sunflower oil, canola oil, peanut oil, safflower oil and the like. In some embodiments, the lipids in the composition can consist of the MCTs and one or more of any vegetable oil, any fish oil, the lipid from any meat, and any omega-3 fatty acids.

Non-limiting examples of suitable flavorants include yeast, tallow, rendered animal meals (e.g., poultry, beef, lamb, pork), flavor extracts or blends (e.g., grilled beef), animal digests, and the like. Non-limiting examples of suitable colorants include FD&C colors, such as blue no. 1, blue no. 2, green no. 3, red no. 3, red no. 40, yellow no. 5, yellow no. 6, and the like; natural colors, such as caramel coloring, annatto, chlorophyllin, cochineal, betanin, turmeric, saffron, paprika, lycopene, elderberry juice, pandan, butterfly pea and the like; titanium dioxide; and any suitable food colorant known to the skilled artisan.

The pet food compositions disclosed herein can optionally include additional ingredients, such as starches, humectants, oral care ingredients, preservatives, amino acids, fibers, prebiotics, sugars, animal oils, aromas, other oils additionally or alternatively to vegetable oil, salts, vitamins, minerals, probiotic microorganisms, bioactive molecules or combinations thereof.

Non-limiting examples of suitable starches include a grain such as corn, rice, wheat, barley, oats, potatoes, peas, beans, cassava, and the like, and mixtures of these grains, and can be included at least partially in any flour. Non-limiting examples of suitable humectants include salt, sugars, propylene glycol and polyhydric glycols such as glycerin and sorbitol, and the like. Non-limiting examples of suitable oral care ingredients include alfalfa nutrient concentrate containing chlorophyll, sodium bicarbonate, phosphates (e.g., tricalcium phosphate, acid pyrophosphates, tetrasodium pyrophosphate, metaphosphates, and orthophosphates), peppermint, cloves, parsley, ginger and the like. Non-limiting examples of suitable preservatives include potassium sorbate, sorbic acid, sodium methyl para-hydroxybenzoate, calcium propionate, propionic acid, and combinations thereof.

Specific amounts for each additional ingredient in the pet food compositions disclosed herein will depend on a variety of factors such as the ingredient included in the first edible material and any second edible material; the species of animal; the animal's age, body weight, general health, sex, and diet; the animal's consumption rate; the purpose for which the food product is administered to the animal; and the like. Therefore, the components and their amounts may vary widely.

Yet another aspect of the present disclosure is a method of making a pet food, the method comprising adding MCTs to other comestible ingredients, including an ingredient(s) that include protein, carbohydrates, and/or fat, such that the composition can increase ketone bodies in the animal. For example, the MCTs can be added with food ingredients such that a single serving of the food can increase postprandial measured ketone bodies (e.g. BHB), in the blood of the animal.

EXAMPLE

By way of example and not limitation, the following non-limiting study is illustrative of compositions and methods for increasing ketone bodies in an animal, in one or more embodiments provided by the present disclosure.

Example 1—Ketone Body Study in Canine

A total of 20 Beagle dogs (mean age: 9.7 years, ranges from 7.9 to 12.1 years, 10 males and 10 females) with body condition scores (BCS) between 4 to 6 were recruited in this cross-over study. Each dog's maintenance energy requirement (MER) was determined by its current food intake that sustains its body weight. The dogs were randomized into two groups with 10 dogs per group based on their MER (MER=feed amount per day), BCS, gender, and age. The diets are listed in Tables 1 and 2.

TABLE 1

|  | Fat (% of total energy) | Carbohydrate (% of total energy) | Protein (% of total energy) |
| --- | --- | --- | --- |
| Control MCT diet | 33.81 (10.48 MCT + 23.34 LCT) | 38.33 | 27.85 |
| Test MCT diet | 31.96 (10.57 MCT + 21.39 LCT) | 17.18 | 50.86 |

TABLE 2

|  | Fat (weight % of food) | CHO (weight % of food) | Protein (weight % of food) |
| --- | --- | --- | --- |
| Control MCT diet | 15.3 (5.5 MCT + 9.8 LCT) | 39.1 | 28.4 |

TABLE 2-continued

|  | Fat (weight % of food) | CHO (weight % of food) | Protein (weight % of food) |
| --- | --- | --- | --- |
| Test MCT diet | 14.4 (5.5 MCT + 8.9 LCT) | 17.4 | 51.4 |

All dogs were fed 100% of their maintenance energy requirement during the study. First, dogs in Group 1 were fed the Control MCT (Medium-chain triglyceride diet) diet containing 27.85% protein, 38.33% carbohydrate, and 33.81% fat including 10.48% MCTs, and dogs in Group 2 were fed the Test MCT diet (50.86% protein, 17.18% carbohydrate, and 31.96% fat including 10.57% MCTs) for 27 days. Then the dogs in Group 1 were switched to Test MCT diet for 32 days, and dogs in Group 2 were switched to the Control MCT diet for 32 days. The Test MCT diet was higher in protein (50.86% of the dietary energy), and low in carbohydrates, and contains only about 32% of dietary energy as fat. Therefore, the test MCT diet is not a typical ketogenic diet as discussed further below.

The dogs were fed in the morning and 2 ml of blood was collected at 0, 1, 2, 4, 6, and 8 hours after feeding at the end of the each cross-over phases. Serum Separator tube (SST) or Red Top blood collection tubes were used. Serum samples (two tubes with 0.5 ml per tube per dog per collection) were used for beta-hydroxybutyrate (BHB) assay.

The results showed that both diets had similar baseline ketone bodies measured as BHB (0.2269 vs 0.1855 mg/dL), but the Test MCT diet resulted in significantly higher average postprandial BHB during the 8 hours after the meal (0.5038 vs 1.2281 mg/dL) compared with the dogs fed the control MCT diet. At the end of the 8 hour sample collection, the dogs fed the Test MCT had more than 2 times of BHB compared with the dogs fed the Control MCT diet (0.967 vs 0.385 mg/dL) as shown in Table 3.

TABLE 3

| Sampling time (hours) | Control MCT diet | MCT Diet | P value |
| --- | --- | --- | --- |
| 0 | 0.2269 ± 0.0535 | 0.1855 ± 0.0530 | 0.5776 |
| 1 | 0.5390 ± 0.0856 | 1.1685 ± 0.0842 | 0.0002 |
| 2 | 0.5908 ± 0.09996 | 1.7220 ± 0.0980 | <.0001 |
| 4 | 0.5531 ± 0.0661 | 1.3190 ± 0.0653 | <.0001 |
| 6 | 0.4510 ± 0.0549 | 0.9640 ± 0.0549 | <.0001 |
| 8 | 0.3850 ± 0.0474 | 0.9670 ± 0.0474 | <.0001 |

Notably, the MCT diet provided higher ketone body levels at each interval of 1, 2, 4, 6, and 8 hours postprandial even though the dogs fed the control diet initially had a higher ketone body level before administration. Since both diets had identical inclusion rate of MCTs, the markedly increased ketone bodies cannot be solely attributed to the MCT content but to the entire diet including protein and carbohydrate amounts. Notably, the present test diet differs significantly from traditional ketogenic diets, MCT-containing ketogenic diets, and other modified ketogenic diets as shown in Tables 4 and 5. These known ketogenic diets have dietary fat as the most predominant component, followed by dietary protein, and lastly carbohydrate. On the contrary, the present inventive compositions have protein as the most predominant component, followed by carbohydrate and lastly dietary fat (Table 2). As such, in one embodiment, the present compositions can have an amount of protein that is greater than the amount of carbohydrate, where the amount of carbohydrate is greater than the amount of fat.

TABLE 4

|  | Fat (% of total energy) | Carbohydrate (% of total energy) | Protein (% of total energy) |
| --- | --- | --- | --- |
| Traditional Ketone Diet | 90 LCT | 4 | 6 |
| MCT Test Diet | 45-60 MCT + 10-30 LCT | 15-20 | 10 |
| Modified Atkins Ketone diet | 65 LCT | 10 | 25 |
| Low Glycemic Index Diet | 60 | 10 | 30 |

TABLE 5

|  | Fat (weight % of food) | Carbohydrate (weight % of food) | Protein (weight % of food) |
| --- | --- | --- | --- |
| Traditional Ketone Diet | 80 LCT | 8 | 12 |
| MCT Ketone Diet | 38-55 MCT + 7-19 LCT | 22-31 | 15 |
| Modified Atkins Ketone diet | 45 LCT | 16 | 39 |
| Low Glycemic Index Diet | 40 | 15 | 45 |

A traditional ketogenic diet (KD) usually contain a ratios of 3 or 4 parts of fat to 1 part of protein and carbohydrate (Bough and Rho, 2007; Dhamija et al., 2013). However, those ketogenic diets, which consists of up to 90% fat, 4% carbohydrate and 6% protein, are not balanced diets with some side effects including constipation, vomiting, lack of energy, and hunger (Neal et al., 2008; Dhamija et al., 2013). Three modified ketogenic diets were developed. A MCT ketogenic diet containing MCTs at 45-60% of the dietary energy along with 15%-20% carbohydrate, 10% protein and 10-30% LCT (Neal et al., 2008; Dhamija et al., 2013). A modified Atkins Ketone Diet consists of 65% fat, 10% carbohydrate, and 25% protein. Low glycemic index diet consists of 60% fat, 10% carbohydrate and 30% protein (Dhamija et al., 2013).

The present compositions differ substantially from these known diets with the surprising effect of increasing ketone bodies markedly in the animal without using increased ketone-producing ingredients (e.g. MCTs) and/or limiting dietary protein.

Example 2—Dog Study

Thirty dogs were used in this study. Fifteen dogs were fed 100% MERs with a diet containing 5.5% MCT with 55% C8 and 45% C10 (C8C10 MCT group) for two weeks, while 15 dogs were fed 100% MERs with a diet containing 5.5% C10 MCTs (C10 MCT group) for two weeks. Blood beta-hydroxybutyrate (BHB) levels are provided in Table 6.

TABLE 6

| Time after feeding (Hours) | C8C10 Mix BHB level (μmol/l) | C10 MCT BHB level (μmol/l) |
| --- | --- | --- |
| 0 | 22.73 | 21.13 |
| 1 | 40.28 | 26.00 |

TABLE 6-continued

| Time after feeding (Hours) | C8C10 Mix BHB level (μmol/l) | C10 MCT BHB level (μmol/l) |
| --- | --- | --- |
| 2 | 61.35 | 36.76 |
| 4 | 60.26 | 34.90 |
| 6 | 54.30 | 31.31 |
| 8 | 39.64 | 27.60 |

The results of Table 6 show that dogs in the C8C10 MCT groups had much higher blood BHB than the dogs in the C10 MCT group, indicating that dogs are able to convert most of the C8 MCTs into ketone bodies while majority of the C10 MCTs are not metabolized into ketone bodies.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of increasing ketone bodies in an animal, the method comprising orally administering a composition to the animal, wherein the composition comprises
    medium-chain triglycerides (MCTs) in an amount of about 1% to about 15% by weight of the composition,
    protein in an amount of 30% to 70% by weight of the composition, and
    carbohydrates in an amount of 10% to 25% by weight of the composition;
    wherein the composition has a protein to carbohydrate ratio of 2:1 to 3:1 by weight,
    the protein is the predominant component (w/w) of the composition excluding moisture, and
    the orally administering of the composition to the animal provides an increase of the ketone bodies in the animal.

2. The method of claim 1, wherein the medium-chain triglycerides are 1% to about 7.5% by weight of the composition.

3. The method of claim 1, wherein medium-chain fatty acids of the MCTs are selected from the group consisting of caprylic acid, capric acid, and a mixture thereof.

4. The method of claim 3, wherein the medium-chain fatty acids are at least 25% by weight caprylic acid.

5. The method of claim 3, wherein the medium-chain fatty acids are at least 90% by weight caprylic acid.

6. The method of claim 1, wherein the administering provides about 0.001 g to about 50.0 g of the MCTs per kg body weight of the animal per day.

7. The method of claim 1, wherein the animal is a companion animal.

8. The method of claim 7, wherein the companion animal is a canine.

9. The method of claim 1, wherein the composition is a complete and nutritionally balanced pet food.

10. The method of claim 1, wherein the protein to carbohydrate ratio of the composition is 3:1 by weight.

11. The method of claim 1, wherein the composition comprises fat that comprises the MCTs, and the fat is about 20% to about 40% by weight of the composition.

12. The method of claim 1, wherein the composition further comprises long-chain triglycerides (LCTs).

13. The method of claim 12, wherein the composition comprises fat that comprises the MCTs and the LCTs, and the fat is about 20% to about 40% by weight of the composition.

14. The method of claim 1, wherein the composition has an amount of total carbohydrate that is greater than an amount of total fat.

15. A composition for increasing ketone bodies in an animal, the composition comprising:
   medium-chain triglycerides (MCTs) in an amount of about 1% to about 15% by weight of the composition,
   protein in an amount of 30% to 70% by weight of the composition, and
   carbohydrates in an amount of 10% to 25% by weight of the composition;
   wherein the composition has a protein to carbohydrate ratio of 2:1 to 3:1 by weight,
   the protein is the predominant component (w/w) of the composition excluding moisture, and
   oral administration of the composition to the animal provides an increase of the ketone bodies in the animal.

16. The composition of claim 15, wherein the medium-chain triglycerides are 1% to about 7.5% of the composition.

17. The composition of claim 15, wherein medium-chain fatty acids of the MCTs are selected from the group consisting of caprylic acid, capric acid, and a mixture thereof.

18. The composition of claim 17, wherein the medium-chain fatty acids are at least 25% by weight caprylic acid.

19. The composition of claim 17, wherein the medium-chain fatty acids are at least 90% by weight caprylic acid.

20. The composition of claim 15, wherein the composition is a complete and nutritionally balanced pet food.

* * * * *